(12) United States Patent
Komatsu et al.

(10) Patent No.: US 10,022,878 B2
(45) Date of Patent: Jul. 17, 2018

(54) ROBOT

(71) Applicant: Seiko Epson Corporation, Tokyo (JP)

(72) Inventors: Daisuke Komatsu, Suwa (JP);
Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 296 days.

(21) Appl. No.: 14/865,322

(22) Filed: Sep. 25, 2015

(65) Prior Publication Data

US 2016/0089777 A1  Mar. 31, 2016

(30) Foreign Application Priority Data

Sep. 30, 2014 (JP) .................................. 2014-200030

(51) Int. Cl.
*B25J 9/00* (2006.01)
*B25J 19/00* (2006.01)
*B25J 9/04* (2006.01)

(52) U.S. Cl.
CPC ............ *B25J 19/005* (2013.01); *B25J 9/046* (2013.01); *Y10S 901/14* (2013.01); *Y10S 901/28* (2013.01)

(58) Field of Classification Search
CPC ................................ B25J 9/046; B25J 19/005
USPC ................ 74/490.01, 490.05; 901/17, 23, 28
See application file for complete search history.

(56) References Cited

U.S. PATENT DOCUMENTS

| | | |
|---|---|---|
| 4,540,332 A | 9/1985 | Nakashima et al. |
| 5,006,035 A | 4/1991 | Nakashima et al. |
| 5,513,946 A * | 5/1996 | Sawada ............... B25J 9/042 414/744.5 |
| 9,037,293 B2 | 5/2015 | Gomi et al. |
| 2014/0067125 A1 | 3/2014 | Niu |
| 2015/0257903 A1* | 9/2015 | Perry .................. A61F 2/70 623/24 |
| 2015/0258693 A1 | 9/2015 | Yazawa et al. |

FOREIGN PATENT DOCUMENTS

| | | |
|---|---|---|
| EP | 0671245 A1 | 9/1995 |
| JP | S61-249286 A | 11/1986 |
| JP | S61-252088 A | 11/1986 |
| JP | 05-067490 B2 | 9/1993 |
| JP | 05-067490 U | 9/1993 |
| JP | H07-246587 A | 9/1995 |
| JP | 2950564 B2 | 9/1999 |
| JP | 2011-065941 A | 3/2011 |
| JP | 2011-198554 A | 10/2011 |
| JP | 2014-034106 A | 2/2014 |
| JP | 2014-046401 A | 3/2014 |
| JP | 2014-046405 A | 3/2014 |

OTHER PUBLICATIONS

Extended European Search Report for Application No. EP 15 18 7083 dated Dec. 21, 2015 (8 pages).

* cited by examiner

*Primary Examiner* — William C Joyce
(74) *Attorney, Agent, or Firm* — Harness, Dickey & Pierce, P.L.C.

(57) ABSTRACT

A robot includes a supporting unit that rotatably supports a first passive shaft part, and a first arm fixed to the first passive shaft part, wherein the first arm has an internal space overlapping with the first passive shaft part in a direction orthogonal to a center shaft of the first passive shaft part.

2 Claims, 3 Drawing Sheets

ROBOT

BACKGROUND

1. Technical Field

The present invention relates to a robot, and specifically to a structure of a manipulator of the robot.

2. Related Art

In related art, in an articulated robot, the parts housed in an arm include a motor, a pulley, a pulley belt, an inertial sensor for detection of angular velocity and acceleration, a backup circuit that stores positions of the arm, a battery for the backup circuit, etc.

JP-A-2014-46401 is an example of related art.

However, an arm closer to a base houses a larger number of flexible connecting members such as electric wires and air pipes. For downsizing of a manipulator, the part layout within the arm is tighter. Further, the flexible connecting members housed in the arm are deformed with rotations of the arm, and it is necessary to enlarge the housing space for the connecting members and the rotation radius of the outer peripheral surface of the arm is likely to be larger.

SUMMARY

A robot according to an aspect of the invention includes a supporting unit that rotatably supports a first passive shaft part, and a first arm fixed to the first passive shaft part, wherein the first arm has an internal space overlapping with the first passive shaft part in a direction orthogonal to a center shaft of the first passive shaft part.

According to the aspect of the invention, the internal space of the first arm is protruded toward the supporting unit side, and thereby, the rotation radius of the outer periphery surface of the arm may be made smaller. That is, the internal space of the first arm is protruded over the base end of the first passive shaft part (the end on the side fixed to the first arm) toward the end side of the first passive shaft part (supporting unit side), and thereby, the internal space of the arm may be enlarged without protrusion of the outer periphery surface of the arm to the outside in the direction of the rotation radius of the arm. Note that "first" of the first arm described in the appended claims is not an identifier for the arm closest to the base, but only an identifier for distinction from the other arms.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Example

As below, embodiments of the invention will be explained with reference to the accompanying drawings. Note that the same signs are assigned to corresponding elements in the respective drawings, and overlapping explanation will be omitted.

Figure 1:
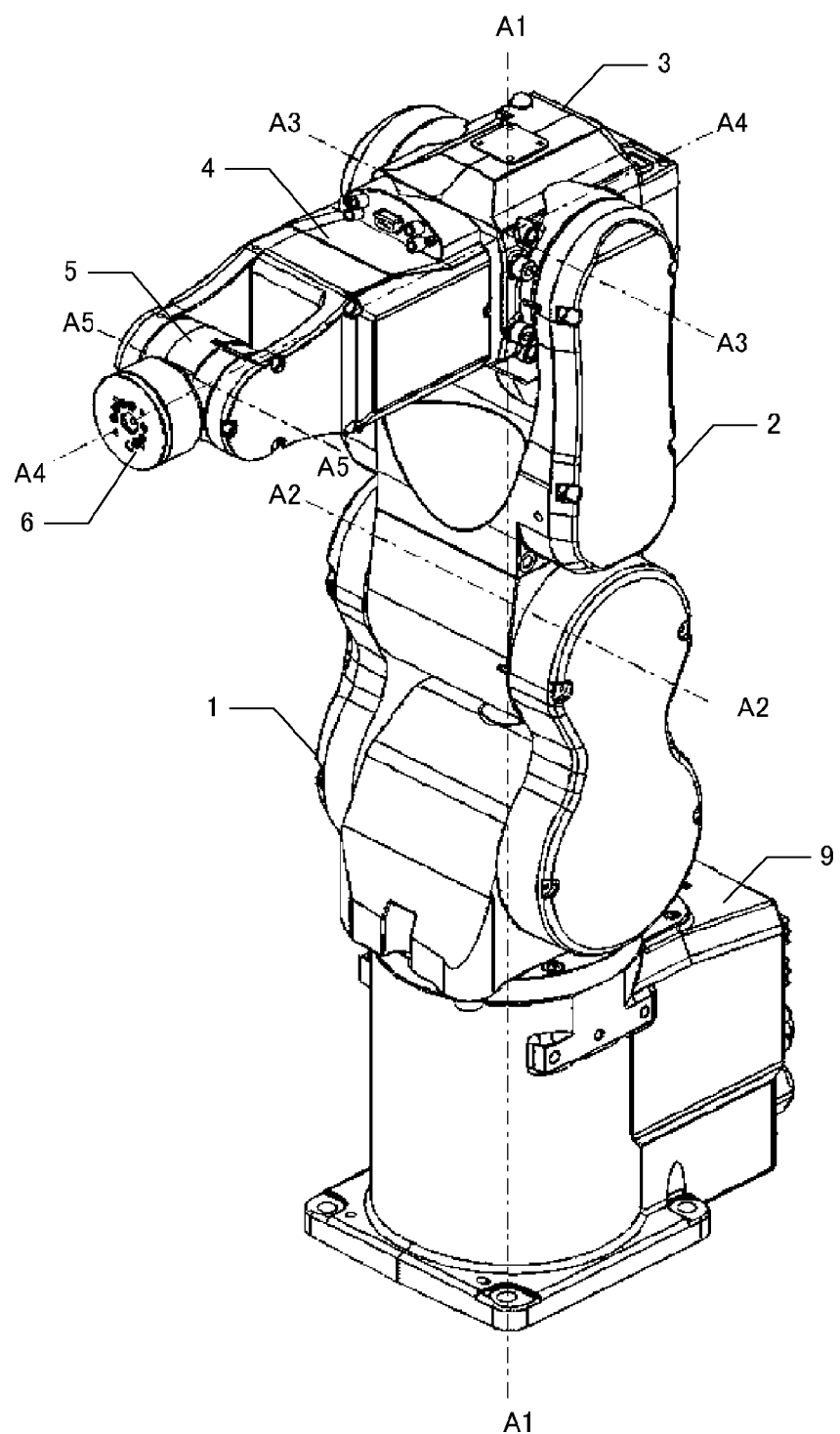
FIG. 1 is a perspective view according to an embodiment of the invention.
Figure 2:
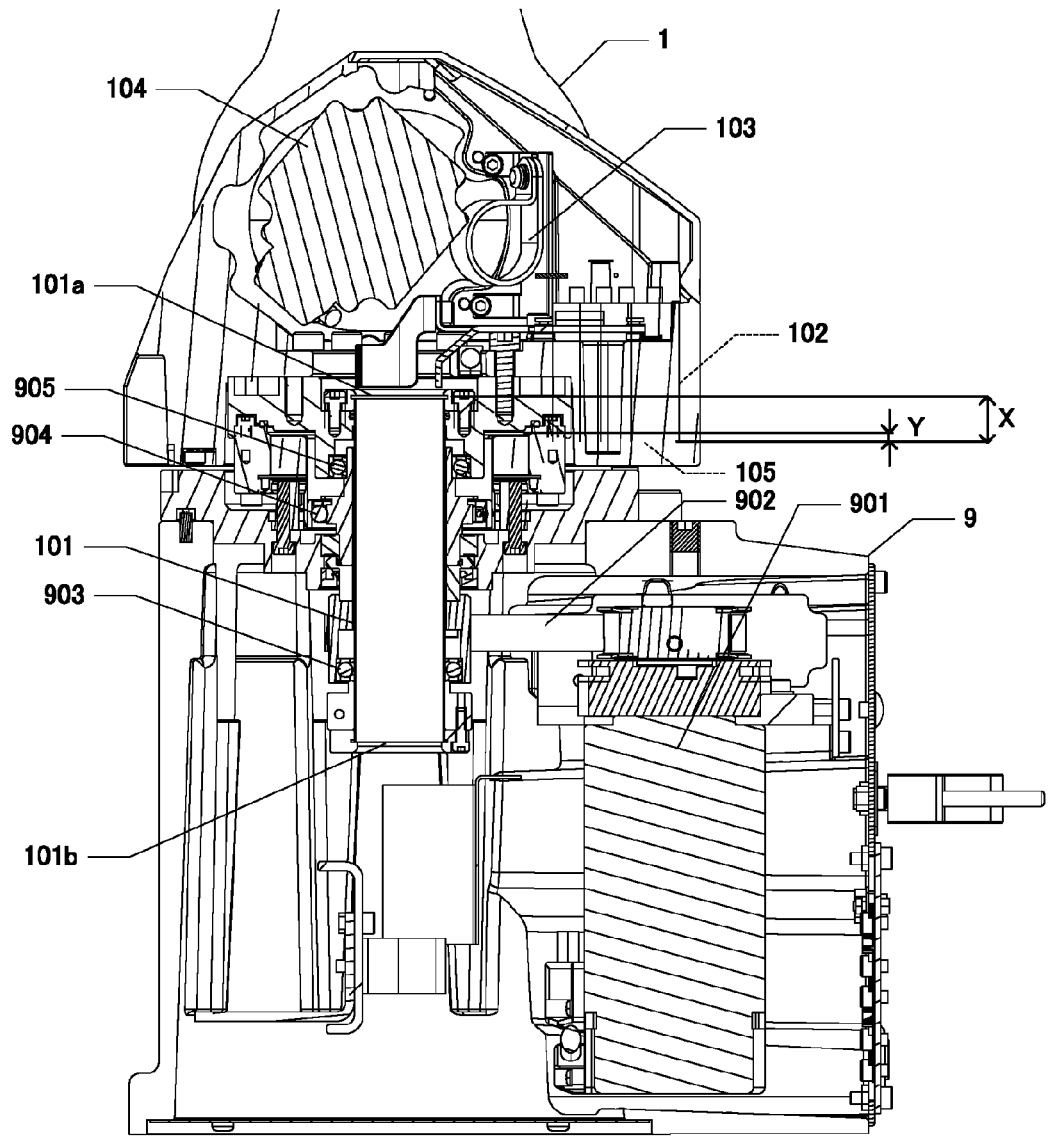
FIG. 2 is a sectional view according to the embodiment of the invention.
Figure 3:
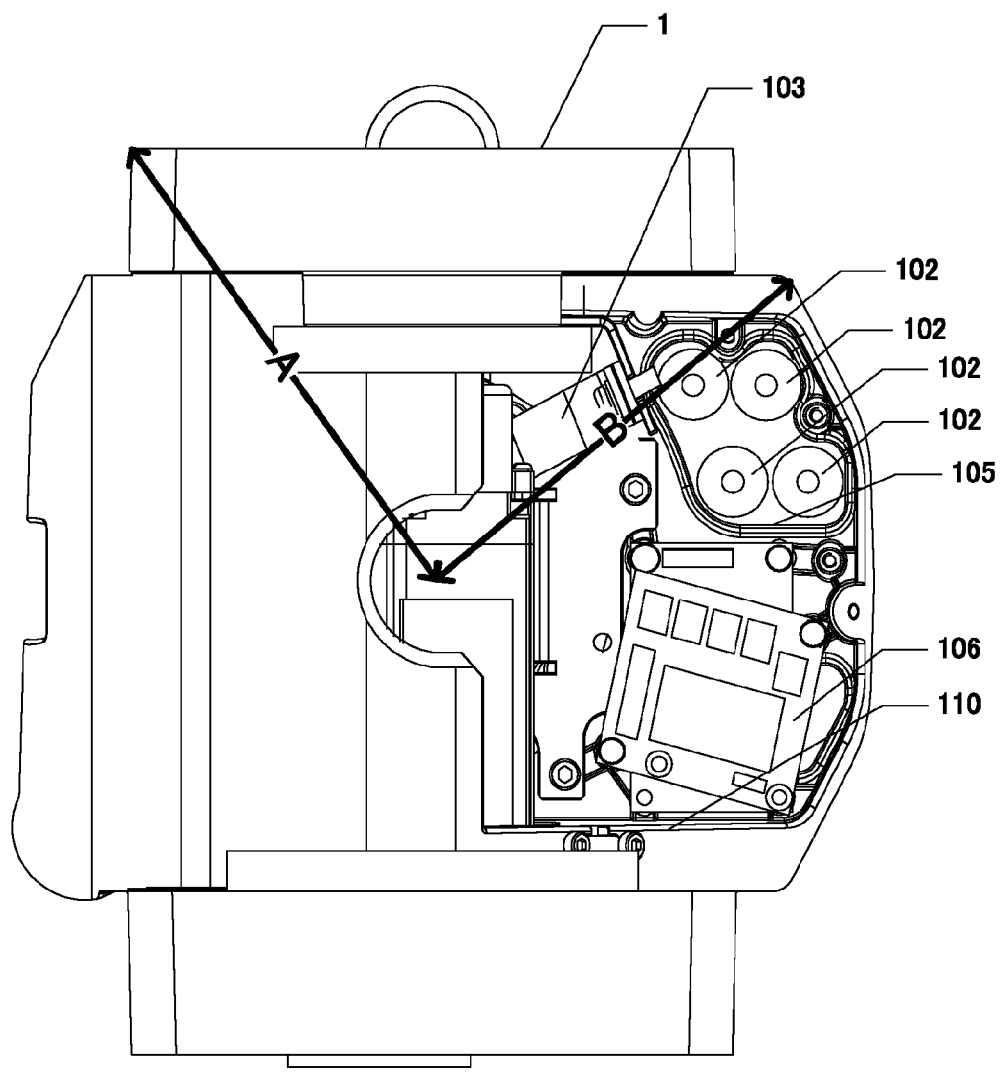
FIG. 3 is a plan view according to the embodiment of the invention.

FIGS. 1, 2, and 3 show a robot as one example of the invention. The robot of the example is a vertical articulated robot including a base 9 and a manipulator including a plurality of arms 1, 2, 3, 4, 5, 6. The base 9 and the arms 1, 2, 3, 4, 5 house motors for driving the manipulator. A motor 901 provided in the base 9 is an actuator that rotates the first arm 1 about a shaft A1 with respect to the base 9. A motor 104 provided in the first arm 1 rotates the second arm 2 about a shaft A2 with respect to the first arm 1. A motor (not shown) provided in the second arm 2 rotates the third arm 3 about a shaft A3 with respect to the second arm 2. A motor (not shown) provided in the third arm 3 rotates the fourth arm 4 about a shaft A4 with respect to the third arm 3. A motor (not shown) provided in the fourth arm 4 rotates the fifth arm 5 about a shaft A5 with respect to the fourth arm 4. A motor (not shown) provided in the fifth arm 5 rotates the sixth arm 6 about the shaft A4 with respect to the fifth arm 5. For example, an actuator operated by air pressure is provided in the sixth arm 6 and the actuator drives a hand (not shown). The rotation shaft A1 of the first arm 1 with respect to the base 9 and the rotation shaft A2 of the second arm with respect to the first arm 1 are orthogonal to each other. The rotation shaft A3 of the third arm 3 with respect to the second arm 2 and the rotation shaft A2 of the second arm 2 with respect to the first arm 1 are in parallel to each other. The rotation shaft A4 of the fourth arm 4 with respect to the third arm 3 and the rotation shaft A3 of the third arm 3 with respect to the second arm 2 are orthogonal to each other. The rotation shaft A5 of the fifth arm 5 with respect to the fourth arm 4 and the rotation shaft A4 of the fourth arm 4 with respect to the third arm 3 are orthogonal to each other. The rotation shaft A4 of the sixth arm 6 with respect to the fifth arm 5 and the rotation shaft A5 of the fifth arm 5 with respect to the fourth arm 4 are orthogonal to each other.

The base 9 as a supporting unit includes ball bearings 903, 904, 905 that rotatably support a first passive shaft part 101 fixed to the first arm 1. The torque of the motor 901 is transmitted to the first passive shaft part 101 via a pulley, a pulley belt 902, etc.

The first arm 1 is fixed to the first passive shaft part 101 driven by the motor 901 and rotates with the first passive shaft part 101. The first arm 1 houses a bundle of connecting members (not shown) including a bundle of a plurality of linear or tubular connecting members such as electric wires and air tubes for connection of actuators, sensors, etc. housed in the respective arms 1, 2, 3, 4, to a drive circuit, a power supply circuit, a control circuit, and a compressor housed in the base 9. The bundle of connecting members are drawn out from the inside of the base 9 through the inside of the first passive shaft part 101 of the first arm 1 to the inside of the first arm 1 and fixed within the first arm 1 by a binding hardware 103.

The first arm 1 houses the motor 104 for rotating a passive shaft part 201 fixed to the second arm 2, the bundle of connecting members, and a battery board 106, batteries 102, a pulley, a pulley belt, etc. A position control unit including a crystal oscillator gyro scope is provided below the battery board 106. The four batteries 102 supply power to encoders of the motors 104, 204, 304, 404, 504 via the battery board 106.

As shown in FIG. 2, the inner wall of the first arm 1 has a recessed part 105 overlapping with the first passive shaft part 101 and the base 9 in a direction orthogonal to the center shaft of the first passive shaft part 101 of the first arm 1 (the rotation shaft of the first arm 1). The recessed part 105 is an internal space of the first arm 1 expanded toward an end 101b of the first passive shaft part 101. The section in which the recessed part 105 overlaps with the first passive shaft part 101 is a section shown by "X" in FIG. 2. The section in which the recessed part 105 overlaps with the base 9 is a section shown by "Y" in FIG. 2. As described above, the internal space of the first arm 1 is protruded over a base end 101a of the first passive shaft part 101 toward the base 9 side, and thereby, the rotation radius of the outer periphery surface of the first arm 1 may be made smaller. That is, the internal space of the first arm 1 is protruded in the recessed part 105 over the base end 101a of the first passive shaft part 101 for rotating the first arm 1 with respect to the base 9 toward the end 101b side, and thereby, the internal space of the first arm 1 may be enlarged without protrusion of the outer periphery surface of the first arm 1 toward the outer side in the direction of the rotation radius of the first arm 1.

As shown in FIG. 3, an opening part 110 for exposure of the battery board 106 and the batteries 102 is formed in the first arm 1. The opening part 110 may be closed by a cover (not shown). As shown in FIGS. 2 and 3, the batteries 102 are disposed in the recessed part 105. The entire of the batteries 102 may be housed in the recessed part 105 or the upper parts of the batteries 102 may protrude from the recessed part 105. The housing positions of the batteries 102 are determined by the recessed part 105, and thereby, a battery case for fixing the batteries 102 is not necessary. Or, screws and attachment operation for fixing the battery case to the first arm 1 are not necessary. Therefore, the replacement operation of the batteries 102 is easier.

As shown in FIG. 2, the recessed part 105 also overlaps with the first passive shaft part 101 and the base 9 in a direction orthogonal to the center shaft (the rotation shaft of the second arm) of the passive shaft part 201 of the second arm 2. The torque of the motor 104 is transmitted to the passive shaft part 201 of the second arm 2 by a pulley and a belt (not shown), and the center shaft of the passive shaft part 201 and the rotation shaft of the motor 104 are in parallel. As shown in FIG. 3, the recessed part 105 is provided to overlap with the first passive shaft part 101 and the base 9 also in a direction orthogonal to the rotation shaft of the motor 104, and thereby, the internal space of the first arm 1 may be expanded without expansion of the internal space of the first arm 1 in the rotation shaft direction of the motor 104. As a result, in addition to the bundle of connecting members and the battery board 106, even when the number of batteries 102 housed in the first arm 1 is increased from two to four, the size of the first arm 1 in the rotation shaft direction of the motor 104 is unchanged.

Specifically, the rotation radius of the first arm 1 is a length "A" shown in FIG. 3 determined by the length in the rotation shaft direction of the motor 104, the length in the rotation shaft direction of the motor 104 necessary for housing of the pulley and the belt fixed to the motor 104, the length in the rotation shaft direction of the motor 104 necessary for housing of the bundle of connecting members, etc. Of the distances from the outer surface of the first arm 1 to the center shaft of the first passive shaft part 101 as seen from the shaft direction of the center shaft of the first passive shaft part 101, suppose that the longest distance not passing through the recessed part 105 is A and the longest distance passing through the recessed part 105 is B, the internal space housing the four batteries 102 is protruded toward the base 9 side, and thereby, the longest distance B may be made shorter than the longest distance A. That is, in the case where the recessed part 105 is not formed unlike the embodiment, when the number of batteries 102 housed in the first arm 1 is increased from two to four, the need to increase the rotation radius of the first arm 1 is caused. However, in the example, the recessed part 105 is provided in the direction orthogonal to the rotation shaft of the motor 104 when the recessed part 105 is seen from the motor 104 and the recessed part 105 is protruded toward the base 9 side as shown in FIG. 2, and thereby, the number of batteries 102 housed in the first arm 1 may be increased from two to four without the increase in the rotation radius of the first arm 1. The number of batteries 102 is increased, and thereby, the replacement frequency of the batteries 102 may be made lower.

2. Other Embodiments

The technological range of the invention is not limited to the above described example and, obviously, various changes may be made without departing from the scope of the invention.

For example, the number of arms forming the manipulator may be one or more, or the invention may be applied to a scalar robot having a translating arm. Further, the movement of the arm with respect to the base is not limited to rotation but may be telescopic or translation.

Furthermore, for example, for expansion of the internal space of the first arm toward the base side, an internal space partitioned by a wall from the internal space housing the motor and the bundle of connecting members may be formed closer to the end side than to the base end of the passive shaft part. Further, objects housed in the internal space expanded toward the base side may include not only the batteries but also electronic functional components such as a power supply circuit unit, a gyro scope, and a temperature sensor. The electronic functional components are housed in the recessed part and positioned, and thereby, workability at replacement is improved. In the case where an oscillator gyro scope is housed in the recessed part, the bundle of connecting members twisted and moved in the internal space of the first arm 1 are harder to be in contact with the oscillator gyro scope, and an advantage of noise reduction of the oscillator gyro scope is obtained.

In addition, the invention may be applied to the second arm 2, the third arm 3, the fourth arm 4, and the fifth arm 5 of the above described example.

The entire disclosure of Japanese Patent Application No. 2014-200030, filed Sep. 30, 2014 is expressly incorporated by reference herein.

What is claimed is:
1. A robot comprising:
a base that includes a first motor, a first shaft, and a first outer cover, the first motor being configured to drive the first shaft so that the first shaft rotates around a first rotation axis relative to the base, the first outer cover housing the first motor and the first shaft; and
a first arm that includes a second motor, a battery, and a second outer cover, the first arm being fixed to the first shaft so that the first arm rotates around the first rotation axis relative to the base when the first shaft rotates, the second outer cover housing the second motor and the battery,
wherein when viewed in a first rotation axis direction along the first rotation axis, a longest distance between the first rotation axis and a first position on the second outer cover is defined as dimension A, wherein a first linear line on the dimension A is laterally shifted from the battery, when viewed in the first rotation axis direction, a longest distance between the first rotation axis and a second position on the second outer cover is defined as dimension B, wherein a second linear line on the dimension B passes through the battery, and A>B, and wherein when viewed in a second direction orthogonal to the first rotation axis direction, the battery is overlapped with the first shaft.

2. The robot according to claim 1, further comprising:

a second arm that includes a third motor, the second arm being fixed to a second shaft, wherein the first arm rotatably supports the second shaft, the second motor is configured to drive the second shaft so that the second shaft rotates around a second rotation axis relative to the first arm, and the second arm rotates around the second rotation axis relative to the first arm when the second shaft rotates, and the first rotation axis is orthogonal to the second rotation axis.

* * * * *